(12) United States Patent
Monti

(10) Patent No.: US 10,414,596 B2
(45) Date of Patent: Sep. 17, 2019

(54) TRANSPORT SYSTEM

(71) Applicant: MARCHESINI GROUP S.p.A., Pianoro (Bologna) (IT)

(72) Inventor: Giuseppe Monti, Pianoro (IT)

(73) Assignee: MARCHESINI GROUP S.P.A., Pianoro (Bologna) (IT)

( * ) Notice: Subject to any disclaimer, the term of this patent is extended or adjusted under 35 U.S.C. 154(b) by 0 days.

(21) Appl. No.: 16/329,476

(22) PCT Filed: Sep. 5, 2017

(86) PCT No.: PCT/IB2017/055325
§ 371 (c)(1),
(2) Date: Feb. 28, 2019

(87) PCT Pub. No.: WO2018/047059
PCT Pub. Date: Mar. 15, 2018

(65) Prior Publication Data
US 2019/0218038 A1     Jul. 18, 2019

(30) Foreign Application Priority Data

Sep. 12, 2016   (IT) ........................ 102016000091512

(51) Int. Cl.
*B65G 35/06* (2006.01)
*B65G 17/20* (2006.01)
(Continued)

(52) U.S. Cl.
CPC .......... *B65G 35/063* (2013.01); *B65G 17/20* (2013.01); *B65G 47/61* (2013.01); *B65G 54/02* (2013.01)

(58) Field of Classification Search
CPC .......... B65G 9/00; B65G 9/002; B65G 9/008; B65G 17/20; B65G 47/61; B65G 54/02;
(Continued)

(56) References Cited

U.S. PATENT DOCUMENTS 4,867,579 A * 9/1989 Gallone ................ F16C 29/045
                                                          384/53
5,211,279 A * 5/1993 Abbestam .............. B23Q 1/262
                                                          198/748
(Continued)

FOREIGN PATENT DOCUMENTS

DE    3808244 A1    9/1989
EP    0823395 A1    2/1998
(Continued)

*Primary Examiner* — Mark A Deuble
(74) *Attorney, Agent, or Firm* — R. Neil Sudol; Cosud Intellectual Property Intellectual Property Solutions, P. C.; Henry D. Coleman

(57) ABSTRACT

Transport system comprises a guide rail having straight and curved portions, a carriage movable along the rail, first and second roller groups on the carriage, and an auxiliary guide at each curved rail portion, corresponding to the curved portion and having an external wall. The first roller group includes an internal roller on the carriage in permanent contact with an internal guide-rail wall along both straight and curved portions and two external rollers contacting the external guide-rail wall only along the straight portions. The second roller group includes two rollers on the carriage, spaced from the guide rail, and in contact with the external wall of the auxiliary guide when the carriage moves along the curved portions. The internal guide-rail wall has, at each curve, an arched surface facing towards the internal roller of the first roller group.

7 Claims, 9 Drawing Sheets

(51) Int. Cl.
*B65G 47/61* (2006.01)
*B65G 54/02* (2006.01)

(58) Field of Classification Search
CPC .......... E01B 25/00; E01B 25/08; E01B 25/18; E01B 25/22; B66F 9/07; B60L 13/00; B60L 13/03
USPC ...................................................... 198/465.4
See application file for complete search history.

(56) References Cited

U.S. PATENT DOCUMENTS

| | | | |
|---|---|---|---|
| 6,758,325 B2 * | 7/2004 | Greeley | B61B 3/00 198/465.4 |
| 2003/0103697 A1 * | 6/2003 | Mochizuki | B65G 9/002 384/44 |
| 2010/0314223 A1 * | 12/2010 | Franz | B65G 17/20 198/802 |
| 2015/0027338 A1 * | 1/2015 | Aumann | B65G 54/02 104/290 |
| 2016/0031648 A1 | 2/2016 | Prussmeier | |
| 2016/0046444 A1 * | 2/2016 | Fenile | B65G 19/025 198/687.1 |
| 2017/0225693 A1 * | 8/2017 | Fenile | B61B 3/00 |

FOREIGN PATENT DOCUMENTS

| | | |
|---|---|---|
| EP | 1101682 A1 | 5/2001 |
| JP | 2001/171512 A | 6/2001 |

* cited by examiner

TRANSPORT SYSTEM

FIELD OF THE INVENTION

The present invention relates to a transport system for transport of products.

DESCRIPTION OF THE PRIOR ART

In the sector of automatic work machines, there is a known need to transport products, objects, articles, components etc. (such as for example containers on which predetermined operations are to be made) along a predefined pathway so as to be able to know, exactly and precisely, the position and orientation thereof in relation to specific working steps which are to be carried out.

A type of transport system used for transport of products comprises at least a mobile carriage, for transport of at least a relative product, and at least a guide rail having a looped pathway along which the carriage is guided and moved, by relative motor means, such as for example linear motors, or loop-wound conveyor belts on relative drive pulleys.

In this regard, the transport system also comprises a series of rollers, having a cylindrical shape, which are predisposed on the carriage in such a way as to engage the guide rail, the guide rail being conformed so as to have an internal rolling wall and an external rolling wall.

In particular, there are rollers predisposed on the carriage in such a way that the rollers are in contact with and can roll on the internal wall of the guide rail, and there are rollers predisposed on the carriage in such a way that they are in contact with and can roll on the external wall of the guide rail, so as to be able to guarantee the stability of orientation and position of the carriage during the movement thereof along the guide rail.

The contact between the lateral cylindrical wall of the rollers and the walls, internal and external, of the guide rail is therefore of a linear type.

The guide rail, as mentioned above, has a closed loop-wound shape, and comprises two straight portions and two curved portions for linking the straight portions.

A first drawback of these transport systems consists in the stability of the carriage during the passage thereof from a straight portion to a curved portion, as some of the rollers can lose contact with the internal wall or external wall of the guide rail and therefore the other rollers are subjected to a greater rolling friction.

The onset of these circumstances not only influences the stability of the carriage, with repercussions on the correct orientation and positioning of the product to be transported, but also determines more rapid wear on the rollers.

Document US2016/0031648 relates to a transport system for transporting products of the above-described type, which aims at reducing the degree of wear on the rollers.

The transport system described in the above-mentioned document comprises a mobile carriage for transport of at least a product and a loop-wound guide rail along which the carriage is guided and moved by motor means.

In this regard, the transport system comprises a first group of rollers and a second group of rollers that are predisposed and mounted on the carriage for transport thereof along the guide rail.

The guide rail is conformed so as to have an internal rolling wall and at least an external rolling wall for rolling of the rollers mounted on the carriage and comprises a loop-wound shape, with two straight portions and two curved portions connecting the two straight portions.

In particular, the transport system described in document US2016/0031648 is configured in such a way that the rollers of the first group of rollers are predisposed and mounted on the carriage so as to be in contact with the internal rolling wall and the external rolling wall of the guide rail only at the straight portions, and not to be in contact with the two walls in the curved portions, while the rollers of the second group of rollers are predisposed and mounted on the carriage so as to be in contact with the internal rolling wall and the external rolling wall of the guide rail only at the curved portions, and not to be in contact with the two walls in the straight portions.

The first group of rollers comprises at least an internal roller, and at least a pair of external rollers: the internal roller and the pair of external rollers are predisposed and mounted on the carriage in such a way that the internal roller is in contact with the internal wall of the guide rail only at a relative straight portion, while the pair of external rollers are predisposed on the carriage so that they are in contact with the external wall of the guide rail only at a relative straight portion.

Therefore the internal roller and the pair of external rollers of the first group of rollers are contemporaneously in contact with the two walls of the guide rail along the straight portions while they are not in contact with the two walls when the carriage follows a curved portion of the guide rail.

In turn, the second group of rollers comprises at least an internal roller, and at least a pair of external rollers: the internal roller and the pair of external rollers are predisposed and mounted on the carriage in such a way that the internal roller is in contact with the internal wall of the guide rail only at a relative curved portion, while the pair of external rollers are predisposed on the carriage so that they are in contact with the external wall of the guide rail only at a relative curved portion.

Therefore the internal roller and the pair of external rollers of the second group of rollers are contemporaneously in contact with the two walls of the guide rail along the curved portions while they are not in contact with the two walls when the carriage follows a straight portion. of the guide rail.

The internal rolling wall and the external rolling wall of the guide rail have a flat surface at the two straight portions of the guide rail while they have a curved surface having a truncoconical shape, i.e. they represent a portion of lateral surface of a corresponding cone which contains them, at the curved portions of the guide rail.

The rollers of the first group of rollers are cylindrical, i.e. there is a linear contact between the lateral cylindrical wall thereof and the two walls, internal and external, of the guide rail along the relative straight portions.

The rollers of the second group of rollers has, instead, a truncoconical shape, i.e. the lateral surface thereof is a portion of the lateral surface of a cone, so in this case too the contact between the truncoconical rollers of the second group of rollers and the internal and external walls of the curved portions of the guide rail always occurs along a linear portion.

In the transport system described in document US2016/0031648 described above there are however some drawbacks.

Firstly, problems can arise concerning the stability of the carriage at the change of direction of the carriage of the guide rail from the straight portion to the curved portion, as there is a moment of transition in which the rollers of the first group of rollers lose contact with the internal walls and the external walls of the guide rail in the final part of the straight portion, while the rollers of the second group of rollers must instead gain contact with the two walls at the start of the curved portion. The same drawback occurs during the change of direction of the guide rail from the curved portion to the straight portion.

This can lead to an increase in stresses and strains on the rollers of the two groups, with the consequence that the reduction in the degree of wear is not as good as was hoped for.

Further, the amplitude of the curved portion, defined by the radii of the cones that contain the truncoconical surfaces of the external and internal wall of the curved portion of the guide rail, must be quite large, with the aim of reducing friction, as all the rollers of the second group of rollers, both the internal roller and the pair of external rollers, have a truncoconical shape, and there is therefore a linear contact with both the walls, internal and external, of the curved portion of the guide rail.

This leads to an overall volume of the transport system that is quite significant.

SUMMARY OF THE INVENTION

The aim of the present invention is therefore to provide a new transport system for transporting products that is able to obviate the above-mentioned drawbacks present in the transport systems of known type.

In particular, an aim of the present invention is to provide a new transport system so as to enable significantly reducing the degree of wear on the rollers while at the same time having an overall volume that is contained.

The above-cited aims are attained with a transport system according to the contents of claim 1.

Further characteristics and advantageous aspects of the transport system of the invention are set down in the various dependent claims.

BRIEF DESCRIPTION OF THE DRAWINGS

The characteristics of a preferred, but not exclusive, embodiment of the transport system of the present invention will be described in the following with reference to the appended tables of drawings, in which.

DESCRIPTION OF THE PREFERRED EMBODIMENTS

With reference to the accompanying tables of drawings, reference letter (S) denotes the transport system for transporting products of the present invention. The transport system (S) comprises a guide rail (1) having a looped pathway (visible in particular in FIG. 1) and comprising straight portions (R) and curved portions (C) for linking the straight portions (R).

The guide rail (1) is conformed so as to have an internal rolling wall (11) and an external rolling wall (12), the internal rolling wall (11) and the external rolling wall (12) being conformed in such a way as to have a flat surface at the straight portions (R) and a curved surface at curved portions (C).

Figure 1:
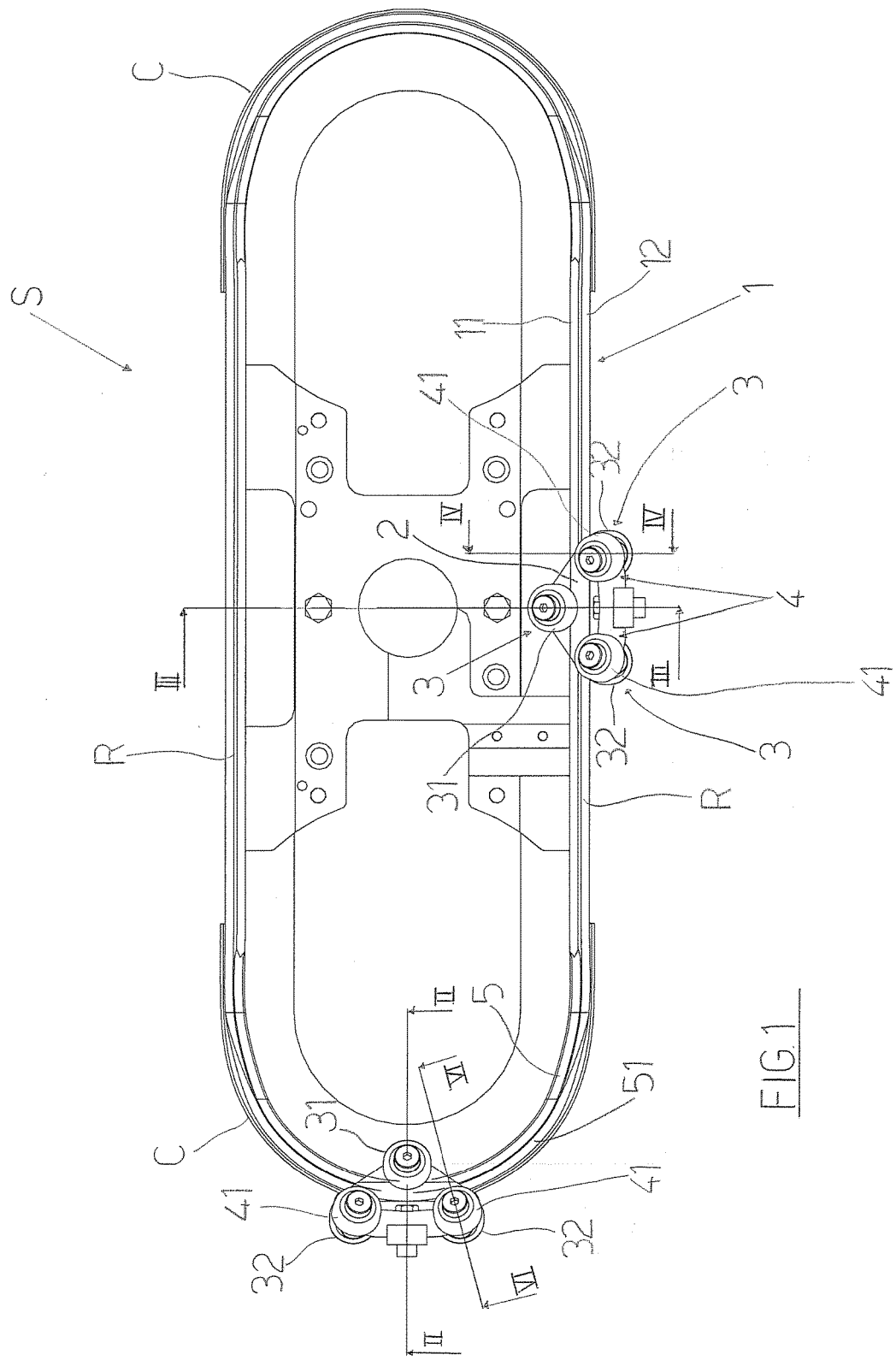
FIG. 1 illustrates a plan view of the transport system of the present invention.
Figure 3:
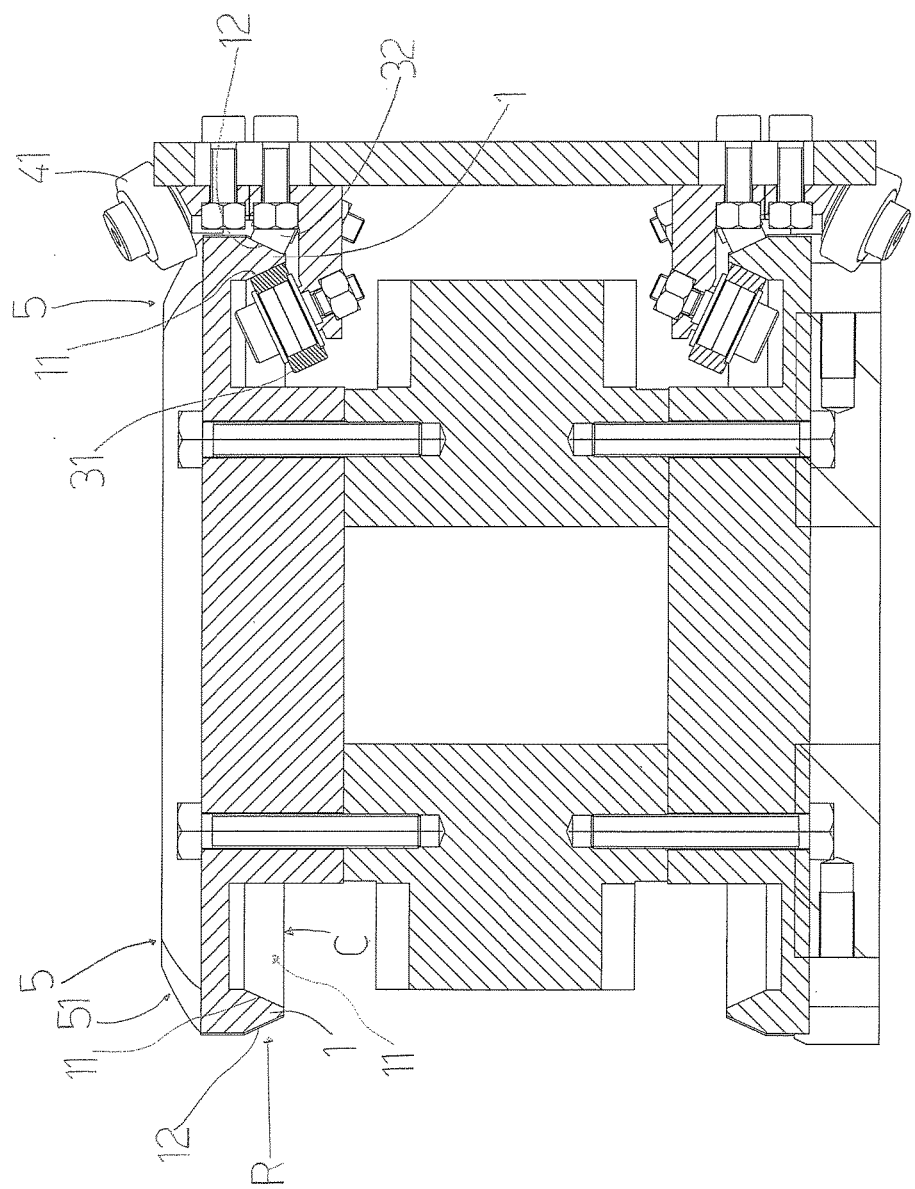
FIG. 3 is a view along section plane III-III of FIG. 1.

For example, see FIG. 3 which illustrates the section according to section plane III-III of FIG. 1, made at a straight portion (R) of the guide rail (1): at the top on the right can be seen the internal wall (11) and the external wall (12) of the guide rail (1) having a flat surface, while on the top on the left of the same figure, the internal wall (11) having a curved surface at the curved portion (C) of the guide rail (1) can be observed.

The transport system (S) further comprises:

at least a carriage (2) for transport of at least a relative product that can be moved by movement means (not illustrated as of known type and not constituting part of the invention) along the guide rail (1) (for example hooking/support elements of known type can be associated to the carriage (2) for engaging and supporting a relative product);

a first group (3) of rollers and a second group (4) of rollers predisposed and mounted on the carriage (2).

Figure 8:
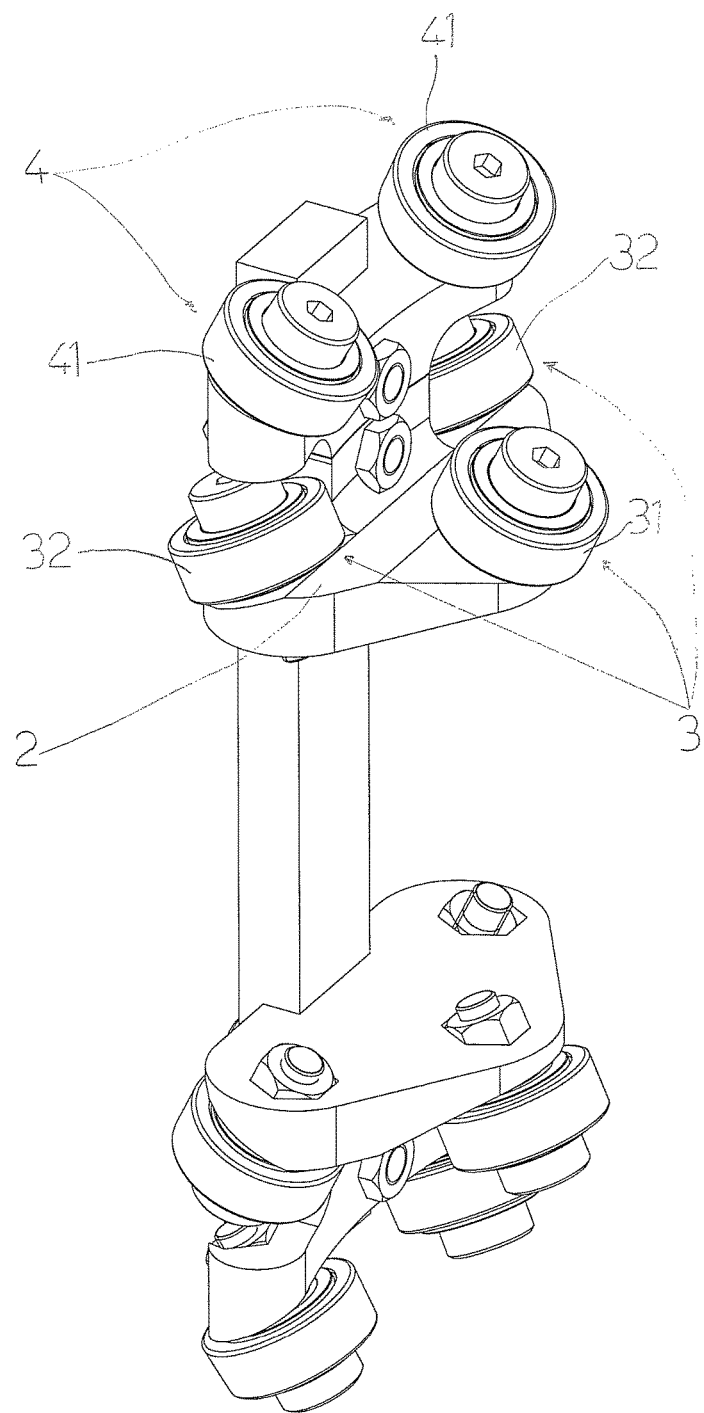
FIG. 8 illustrates some components of the transport system of the present invention.

The first group (3) of rollers comprises an internal roller (31) and a pair of external rollers (32), while the second group (4) of rollers comprising a pair of rollers (41) (see for example FIG. 8 where all the roller of the two groups of rollers are visible).

Figure 4:
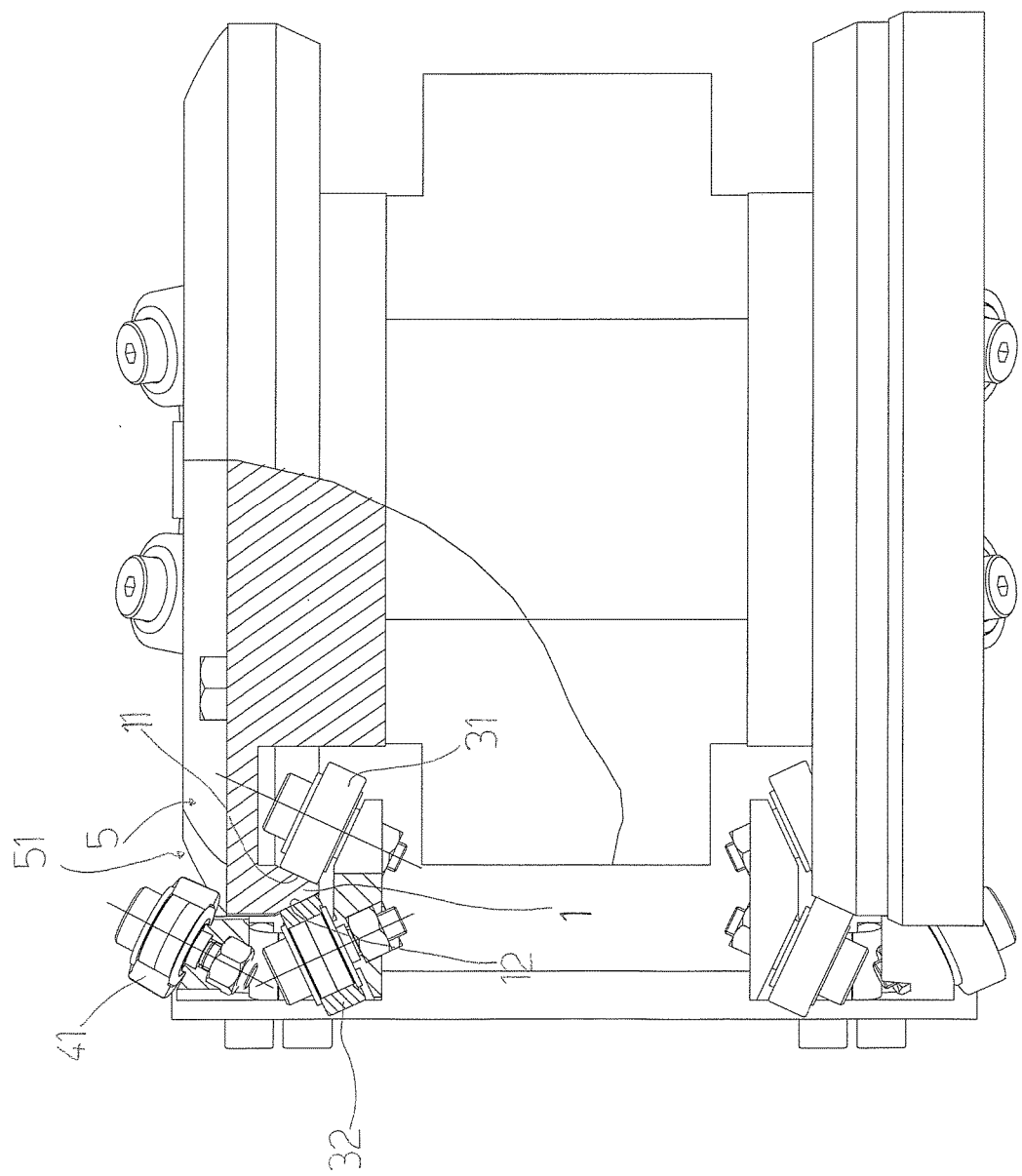
FIG. 4 is a front view of the transport system of the invention, in which a partial transversal section has been carried out according to section plane IV-IV indicated in FIG. 1.

The first group (3) of rollers is predisposed and mounted on the carriage (2) in such a way that the relative internal roller (31) is in contact with and rolls on the internal wall (11) of the guide rail (1) at the straight portions (R) and in such a way that the pair of external rollers (32) is in contact with and rolls on the external wall (32) of the guide rail (1) at the straight portions (R), so that the internal roller (31) and the pair of external rollers (32) are contemporaneously in contact with and roll on the internal wall (11) and external wall (12) of the guide rail (1) at the straight portions (R) when the carriage (2) is moved along the straight portions (R) (for example see FIGS. 3 and 4 in this regard).

Figure 2:
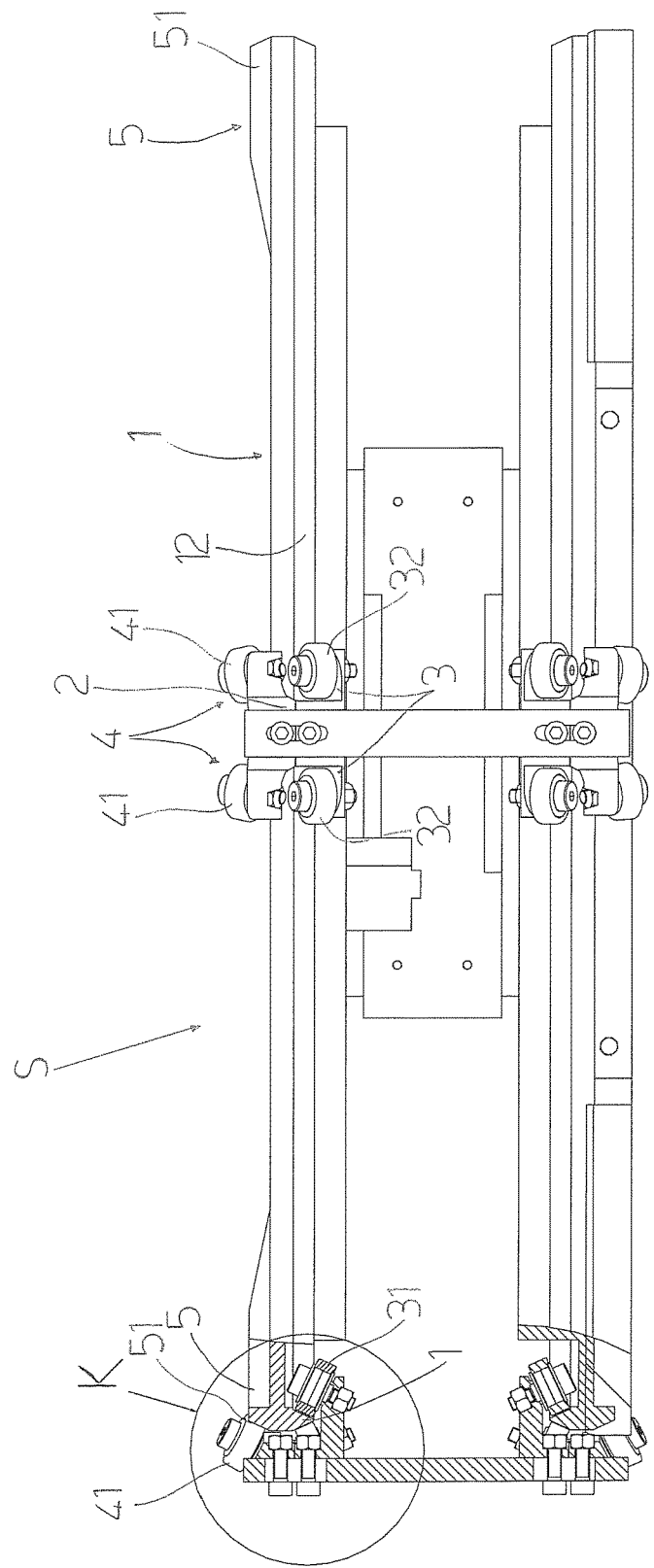
FIG. 2 is a lateral view of the transport system of the invention, in which a partial transversal section has been carried out according to section plane II-II indicated in FIG. 1.

The pair of rollers (41) of the second group (4) of rollers is instead predisposed and mounted on the carriage (2) so that the rollers (41) are distant from the guide rail (1) and so as not to be in contact with the guide rail (1) at the straight portions (R) of the guide rail (1) when the carriage (2) is moved along the straight portions (R) (see FIG. 2, with the central carriage at the top, FIG. 3, at the top on the right, and FIG. 4, at the top on the left).

Figure 7:
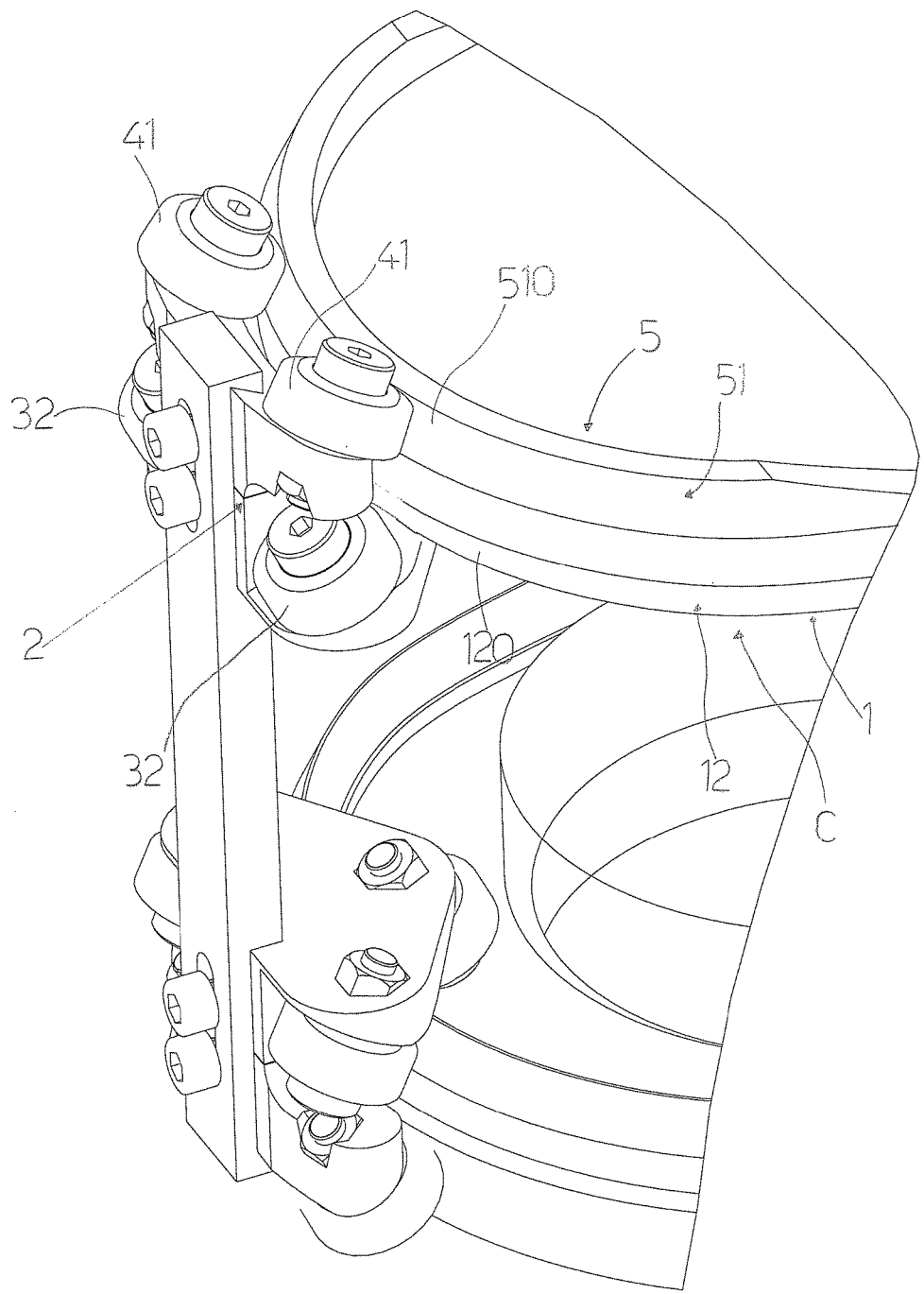
FIG. 7 illustrates a partial perspective view of some significant elements of the transport system of the present invention.

A first peculiarity of the transport system (S) of the invention consists in the fact that it comprises an auxiliary guide element (5) predisposed at each curved portion (C) of the guide rail (1) and which is conformed such as to have a progression corresponding to the progression of the curved portion (C) of the guide rail (1) and which has an external rolling wall (51) conformed so as to have a curved surface (510) having a truncoconical shape (see for example FIG. 1 and FIG. 7).

Figure 5:
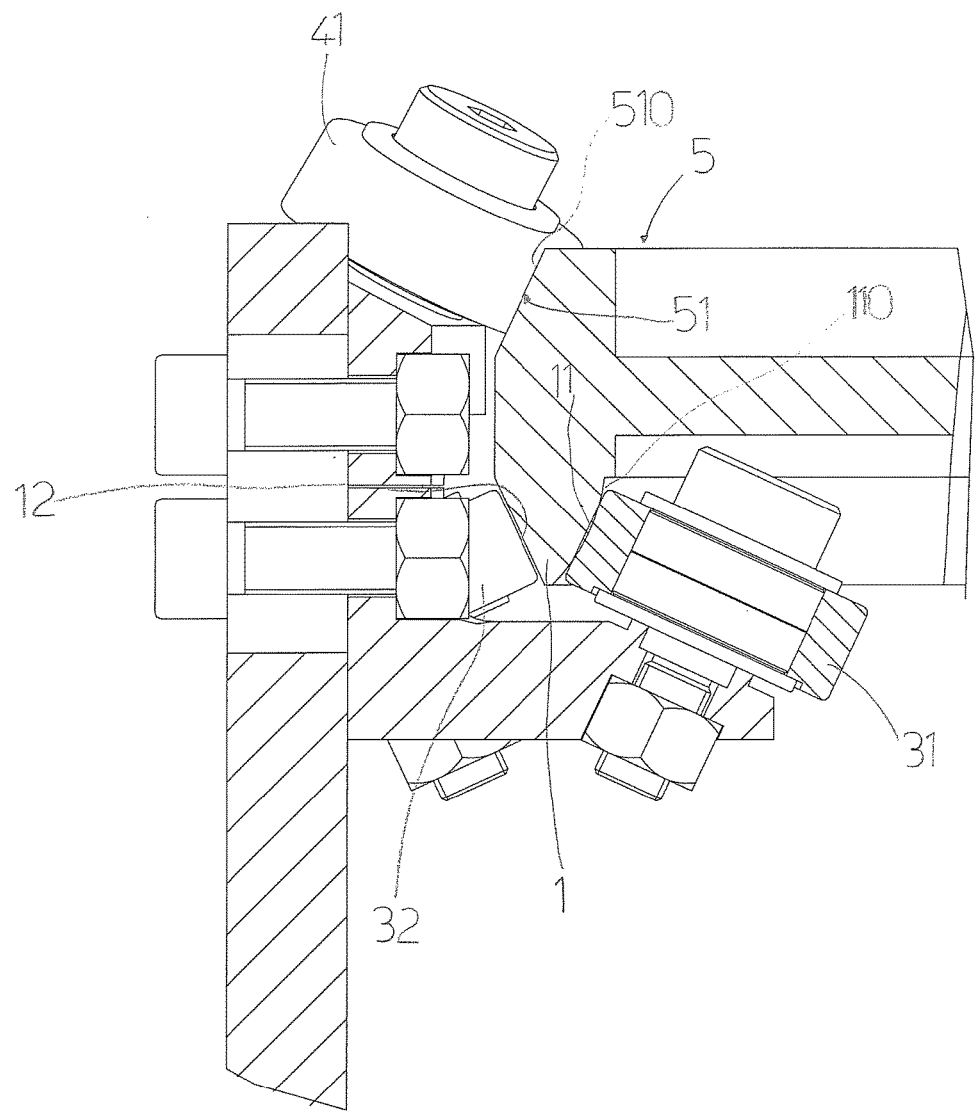
FIG. 5 illustrates detail K of FIG. 2 in larger scale.
Figure 6:
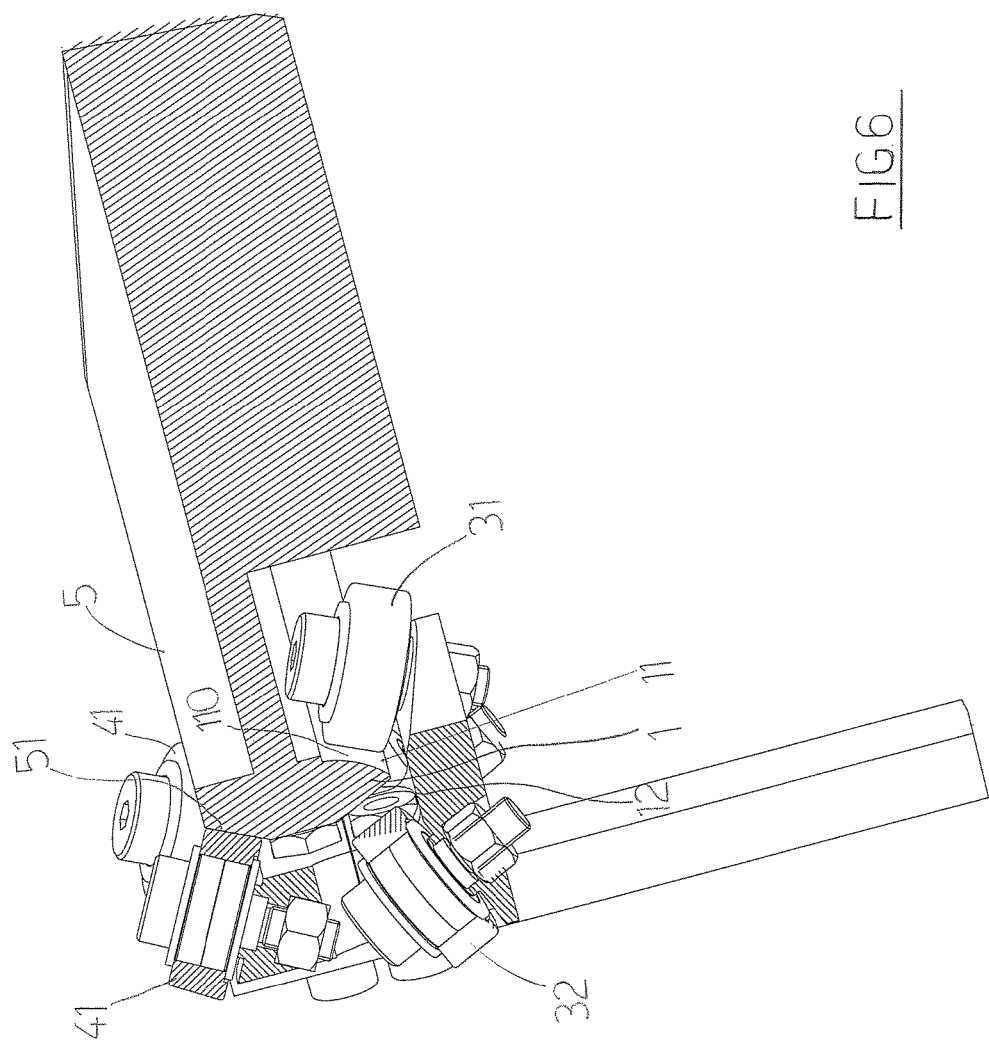
FIG. 6 is a view along section plane VI-VI of FIG. 1, in a larger scale.

Other special characteristics of the transport system (S) of the invention relate to the fact that:

the pair of rollers (41) of the second group (4) of rollers have a truncoconical shape and are predisposed and mounted on the carriage (2) in such a way that, with the lateral truncoconical surface thereof, they contact and roll on the curved truncoconical surface (510) of the external rolling wall (51) of the auxiliary guide element (5) when the carriage (2) is moved along the curved portion (C) of the guide rail (1) (see for example FIG. 7 and FIGS. 5 and 6, which are views along section planes V-V and VI-VI of FIG. 1 drawn at different points of the curved portion (C) of the guide rail (1));

the external wall (12) of the guide rail (1) is also conformed and predisposed so as to have, at each curved portion (C), of the guide rail (1), a curved surface (120) having a progression, with respect to the curved truncoconical surface (510) of the external rolling wall (51) of the auxiliary guide element (5) so that there is play between the curved surface (120) and the pair of external rollers (32) of the first group (3) of rollers so that the external rollers (32) are no longer in contact with the guide rail (1) when the carriage (2) is moved along the curved portion of the guide rail (1) (see for example FIGS. 5 and 7), the internal wall (11) of the guide rail (1) is conformed and predisposed so as to have, at each curved portion (C) of the guide rail (1), a curved arched surface (110) with a curvature facing towards the internal roller (31) of the first group (3) of rollers and with the internal roller (31) of the first group (3) of rollers which is predisposed and mounted on the carriage (2) so as to be in contact with and roll on the curved arched surface (110) of the internal wall (11) of the guide rail (1) at the curved portion (C) of the guide rail (1), when the carriage (2) is moved along the curved portion (C) of the guide rail (1), so that the internal roller (31) of the first group (3) of rollers (see in particular FIGS. 5 and 6) is always in contact with the internal wall (11) of the guide rail (1) both at the straight portions (R) and at the curved portions (C).

With these special features, when the carriage (2) is moved to pass from a straight portion (R) to a curved portion (C) of the guide rail (1), and from a curved portion (C) to a straight portion (R), the internal roller (31) of the first group of rollers (3), the transport system (S) is always and in any case in contact with and rolls on the internal wall (11) of the guide rail due to the special shape of the internal wall (11) which has an arched curved surface (120).

In this way, the carriage (2) is kept stable during the loss of contact of the pair of external rollers (32) of the first group (3) of rollers with the external wall (12) of the guide rail (1) and the initial contact by the pair of rollers (41) of the second group of rollers (4) with the external rolling wall (51) of the auxiliary guide element (5).

This circumstance, as well as guarantee stability of the carriage (2) during transit thereof from a curved portion to a straight portion, further enables reducing the stresses to which the rollers are subjected and therefore reduces the state of wear thereof.

Further, the presence of the auxiliary guide element (5) facilitates the design of the carriage (2) and the arrangement thereon of the various rollers, as well as the changing operations of the contact between the pair of external rollers (32) of the first group (3) of rollers and the pair of rollers (42) of the second group (4) of rollers, as the pair of rollers (42) must not act and go into contact, when the carriage (2) is moved along the curved portion (C), with the external wall (12) of the guide rail (1) against which the pair of external rollers (32) of the first group (3) of rollers are in contact with and roll on when the carriage (2) is moved along a straight portion (R).

Lastly, the circumstance that the external wall (12) of the guide rail (1) is specially designed and predisposed so as to have, at each curved portion (C), of the guide rail (1), a curved surface (120) having a progression, with respect to the curved truncoconical surface (510) of the external rolling wall (51) of the auxiliary guide element (5) so that there is play between the curved surface (120) and the pair of external rollers (32) of the first group (3) of rollers, facilitates the exchange of contact between the pair of external rollers (32) of the first group (1) of rollers and the pair of rollers (41) of the second group (4) of rollers which go into contact with the external rolling wall (51) of the auxiliary guide element (5).

In this way the stresses acting on the rollers are further reduced, with a consequent advantage in terms of reduction of wear thereon.

Further advantageous aspects of the transport system (S) proposed by the present invention are described in the following.

The truncoconical rollers (41) of the second group (4) of rollers are mounted and predisposed on the carriage (2) so that the relative rotation axes intersect in a point situated on the axis of a cone (C1) having a lateral surface that comprises a lateral truncoconical portion defined by the curved truncoconical surface (510) of the external rolling wall (51) of the auxiliary guide element (5).

The cones (C2) generated starting from the lateral truncoconical surface of the rollers (41) of the second group (4) of rollers have the relative vertices in common with one another and arranged at the vertex of the cone (C1) generated starting from the truncoconical surface (510) of the external rolling wall (51) of the auxiliary guide element (5).

The external wall (12) of the guide rail (1) has, at the curved portions (C) of the guide rail (1), a curved surface (120) having a truncoconical shape, and the cone (C3) generated starting from the curved truncoconical surface (120) of the external wall (12) of the guide rail (1), an axis located at the cone axis (C1) generated starting from the curved truncoconical surface (510) of the external rolling wall (51) of the auxiliary guide element (5); further, the cone (C3) generated starting from the curved truncoconical surface (120) of the external wall (12) of the guide rail (1) has, at each straight portion (C), an angle of aperture ($\alpha$) identical to the angle of aperture ($\alpha$) of the cone (C1) generated starting from the curved truncoconical surface (510) of the external rolling wall (51) of the auxiliary guide element (5).

The cone (C3) generated starting from the curved truncoconical surface (120) of the external wall (12) of the guide rail (1) has at each straight portion (C) a base radius that is smaller than the base radius of the cone (C1) generated starting from the curved truncoconical surface (510) of the external rolling wall (51) of the auxiliary guide element (5).

In this way, considering longitudinal section planes, the radius of the truncoconical surface of the external wall of the guide rail at the curved portions is smaller than the radius of the truncoconical surface of the external rolling wall of the auxiliary guide element, enabling obtaining the play between the pair of external rollers of the first group of rollers and the external wall of the guide rail in the curved portions of the guide rail.

Figure 9:
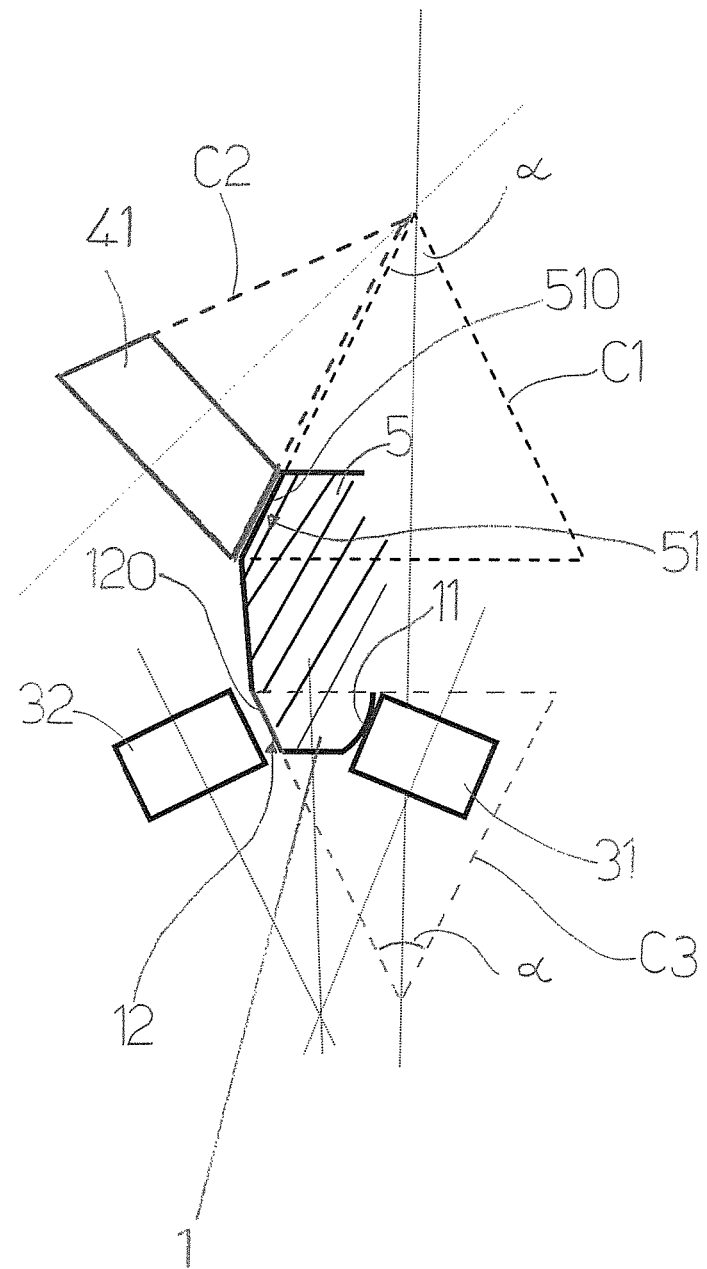
FIG. 9 is a schematic illustration of significant elements of the transport system of the present invention and the mutually geometric arrangement thereof, with reference to a transversal section carried out at a transversal plane to a curved portion of the looped pathway.

In this regard, see FIG. 9 which is a schematic illustration of the roller of the first group of rollers and the rollers of the second group, the guide rail and the auxiliary guide element, the reciprocal arrangement thereof and the relations existing between them as detailed in the foregoing.

The internal roller (31) and the pair of external rollers (32) of the first group (3) of rollers have a cylindrical shape, i.e. they have a cylindrical lateral surface.

This means that when the carriage (2) is moved along a curved portion (C) of the guide rail (1), there is a substantially punctual contact between the cylindrical lateral surface of the internal roller (31) of the first group (3) of rollers and the curved arched surface (110) of the internal wall (11) of the guide rail (1).

This leads to a series of advantages.

Firstly, the reduction of the degree of wear of the internal roller (31), secondly, since the contact between it and the internal wall (11) of the guide rail (1) in the curved portion is substantially punctual, the curvature of the curved portion can be quite tight, in the sense that the degree of curvature of the curved portion can be reduced and be smaller than the known-type transfer systems, where the contact between the rollers which act on the internal roller and the rollers that act on the external wall of the curved portion of the rail is always linear.

There is a consequent significant reduction in the overall volume of the transport system.

Further aspects of the transport system of the invention are the following.

The internal roller (31) and the pair of external rollers (32) of the first group (3) of rollers are mounted and predisposed on the carriage (2) so that the rotation axis of the internal roller (31) is parallel to the flat surface of the internal wall (11) of the guide rail (1) at the straight portion (R) of the guide rail (1) and the rotation axes of the pair of external rollers (32) are parallel to one another and parallel to the flat surface of the external wall (12) of the guide rail (1) at the straight portion (R) of the guide rail (1).

Further, the flat surface of the internal wall (11) and the flat surface of the external wall (12) of the guide rail (1), at the straight portions (R) of the guide rail (1), have the same inclination with respect to the axis of the guide rail (1).

The guide rail (1) therefore has, at the straight portions (R), a transversal section having an isosceles triangular shape or an isosceles trapeze shape.

The transport system (S) of the invention can further be designed and configured so as to have a second guide rail, conformed identically to the guide rail described in the foregoing, but arranged specularly to the guide rail, either above it or below it.

For example, in the figures of the drawings, the second guide rail is arranged below the guide rail (1) described in the foregoing.

Consequently, the transport system will also comprise further auxiliary guide elements arranged at the curved portions of the second guide rail, and further carriages also having a first group of rollers having an internal roller and a pair of external rollers, with the internal roller always being in contact with the internal wall of the second guide rail, both in the straight portions and curved portions, and with the pair of external rollers being in contact with the external wall of the guide rail only in the straight portions, and a second group of rollers comprises at least a pair of rollers predisposed not to be in contact with the guide rail but to go into contact with the external wall of the auxiliary guide elements when the relative carriage is moved along the straight portions of the second guide rail.

In this case the transport system is designed and configured so that a carriage mounted on the second guide rail is connected via a relative bracket or another rigid element to a corresponding carriage mounted on the guide rail (1): in this way there will be a pair of carriages which will be moved along the relative guide rails, for transport of a relative product, ensuring a greater stability thereof.

From the above it is clear that the transport system of the present invention effectively obviates the various drawbacks which are encountered in the transport systems of the prior art described in the preamble hereto.

The invention claimed is:

1. A transport system for transport of products, comprising:
    a guide rail having a loop-wound pathway and comprising straight portions and curved portions for connecting the straight portions, the guide rail being conformed so as to have an internal rolling wall and an external rolling wall, the internal rolling wall and the external rolling wall being conformed in such a way as to have a flat surface at the straight portions and a curved surface at curved portions;
    at least a carriage for transport of at least a respective product that can be moved by movement means along the guide rail;
    a first group of rollers and a second group of rollers predisposed and mounted on the carriage;
    the first group of rollers comprising an internal roller and a pair of external rollers;
    the second group of rollers comprising a pair of rollers;
    the first group of rollers being predisposed and mounted on the carriage in such a way that the respective internal roller is in contact with and rolls on the internal wall of the guide rail at the straight portions and in such a way that the pair of external rollers is in contact with and rolls on the external wall of the guide rail at the straight portions, so that the internal roller and the pair of external rollers are contemporaneously in contact with and roll on the internal wall and external wall of the guide rail at the straight portions when the carriage is moved along the straight portions,
    the pair of rollers of the second group of rollers being predisposed and mounted on the carriage so that the rollers are distant from the guide rail and so as not to be in contact with the guide rail at the straight portions of the guide rail when the carriage is moved along the straight portions;
    an auxiliary guide element predisposed at each curved portion of the guide rail and conformed such as to have a progression corresponding to the progression of the curved portion of the guide rail and having an external rolling wall conformed so as to have a curved surface having a truncoconical shape,
    the pair of rollers of the second group of rollers having a truncoconical shape and being predisposed and mounted on the carriage in such a way that, with the truncoconical lateral surface thereof, they contact and roll on the truncoconical curved surface of the external rolling wall of the auxiliary guide element when the carriage is moved along the curved portion of the guide rail,
    the external wall of the guide rail being also conformed and predisposed so as to have, at each curved portion, of the guide rail, a curved surface having a progression, with respect to the curved truncoconical surface of the external rolling wall of the auxiliary guide element so that there is play between the curved surface and the pair of external rollers of the first group of rollers so that the external rollers are no longer in contact with the guide rail when the carriage is moved along the curved portion of the guide rail, the internal wall of the guide rail being conformed and predisposed so as to have, at each curved portion of the guide rail, a curved arched surface with a curvature facing towards the internal roller of the first group of rollers and with the internal roller of the first group of rollers which is predisposed and mounted on the carriage so as to be in contact with and roll on the curved arched surface of the internal wall of the guide rail at the curved portion of the guide rail, when the carriage is moved along the curved portion of the guide rail, so that the internal roller of the first group of rollers is always in contact with the internal wall of the guide rail both at the straight portions and at the curved portions.

2. The transport system of claim 1, wherein the rollers having a truncoconical shape of the second group of rollers are mounted and predisposed on the carriage so that the respective rotation axes intersect in a point situated on the axis of a cone having a lateral surface that comprises a lateral truncoconical portion defined by the curved truncoconical surface of the external rolling wall of the auxiliary guide element.

3. The transport system of claim 2, wherein the cones generated starting from the lateral truncoconical surface of the rollers of the second group of rollers have the respective vertices in common with one another and arranged at the vertex of the cone generated starting from the curved truncoconical surface of the external rolling wall of the auxiliary guide element.

4. The transport system of claim 3, wherein the external wall of the guide rail has, at the curved portions of the guide rail, a curved surface having a truncoconical shape and in that the cone generated starting from the curved truncoconical surface of the external wall of the guide rail has an axis thereof at the cone axis generated starting from the curved truncoconical surface of the external rolling wall of the auxiliary guide element and an angle of aperture equal to the angle of aperture thereof.

5. The transport system of claim 1, wherein the internal roller and the pair of external rollers of the first group of rollers are cylindrical and in that the internal roller and the pair of external rollers of the first group of rollers are mounted and predisposed on the carriage so that the rotation axis of the internal roller is parallel to the flat surface of the internal wall of the guide rail at the straight portion of the guide rail and the rotation axes of the pair of external rollers are parallel to one another and parallel to the flat surface of the external wall of the guide rail at the straight portion of the guide rail.

6. The transport system of claim 5, wherein the flat surface of the internal wall and the flat surface of the external wall of the guide rail, at the straight portions of the guide rail, have the same inclination with respect to the axis of the guide rail.

7. The transport system of claim 6, wherein the guide rail has, at the straight portions, a transverse section having an isosceles triangular shape or an isosceles trapeze shape.

* * * * *